United States Patent [19]

Nishijima

[11] Patent Number: 5,331,223
[45] Date of Patent: Jul. 19, 1994

[54] SIGNAL SUPPLYING UNIT HAVING MEANS FOR SELECTING SIGNAL IN ACCORDANCE WITH TERMINAL CONNECTION

[75] Inventor: Takashi Nishijima, Fussa, Japan
[73] Assignee: Teac Corporation, Tokyo, Japan
[21] Appl. No.: 894,256
[22] Filed: Jun. 8, 1992

Related U.S. Application Data

[63] Continuation-in-part of Ser. No. 571,738, Aug. 23, 1990, abandoned.

Foreign Application Priority Data

Aug. 25, 1989 [JP] Japan .................. 1-99338[U]

[51] Int. Cl.$^5$ .......... G06G 7/00; H03K 5/22; H04N 5/268
[52] U.S. Cl. .................. 307/529; 328/108; 328/115; 348/705
[58] Field of Search .......... 358/44, 141, 181; 360/27; 307/529; 328/108, 115

[56] References Cited

U.S. PATENT DOCUMENTS

| | | | |
|---|---|---|---|
| 4,620,222 | 10/1986 | Baba et al. | 358/44 |
| 4,888,641 | 12/1989 | Isnardi et al. | 358/141 |
| 4,956,726 | 9/1990 | Takimoto et al. | 360/27 |

Primary Examiner—William L. Sikes
Assistant Examiner—Trong Phan
Attorney, Agent, or Firm—Michael N. Meller

[57] ABSTRACT

A signal supplying unit includes a plurality of terminals, a plurality of signal sources, each of the plurality of signal sources outputting a signal, a detecting circuit for detecting whether or not at least the one of the plurality of terminals is coupled to a terminal of an external unit, and a selecting circuit for selecting signals to be supplied to the plurality of terminals from signals output from the plurality of signal sources in accordance with a detecting result obtained by the detecting circuit. In addition, a signal supplying unit includes a first terminal, a second terminal, a first signal source for outputting a first signal, a second signal source for outputting a second signal, a third signal source for outputting a third signal, a detecting circuit for detecting whether or not the first terminal is coupled to a terminal of an external unit and for outputting a detecting signal, and a selecting circuit for selectively supplying either the second signal output from the second signal source or the third signal output from the third signal source to the second terminal in accordance with the detecting signal output from the detecting circuit.

18 Claims, 7 Drawing Sheets

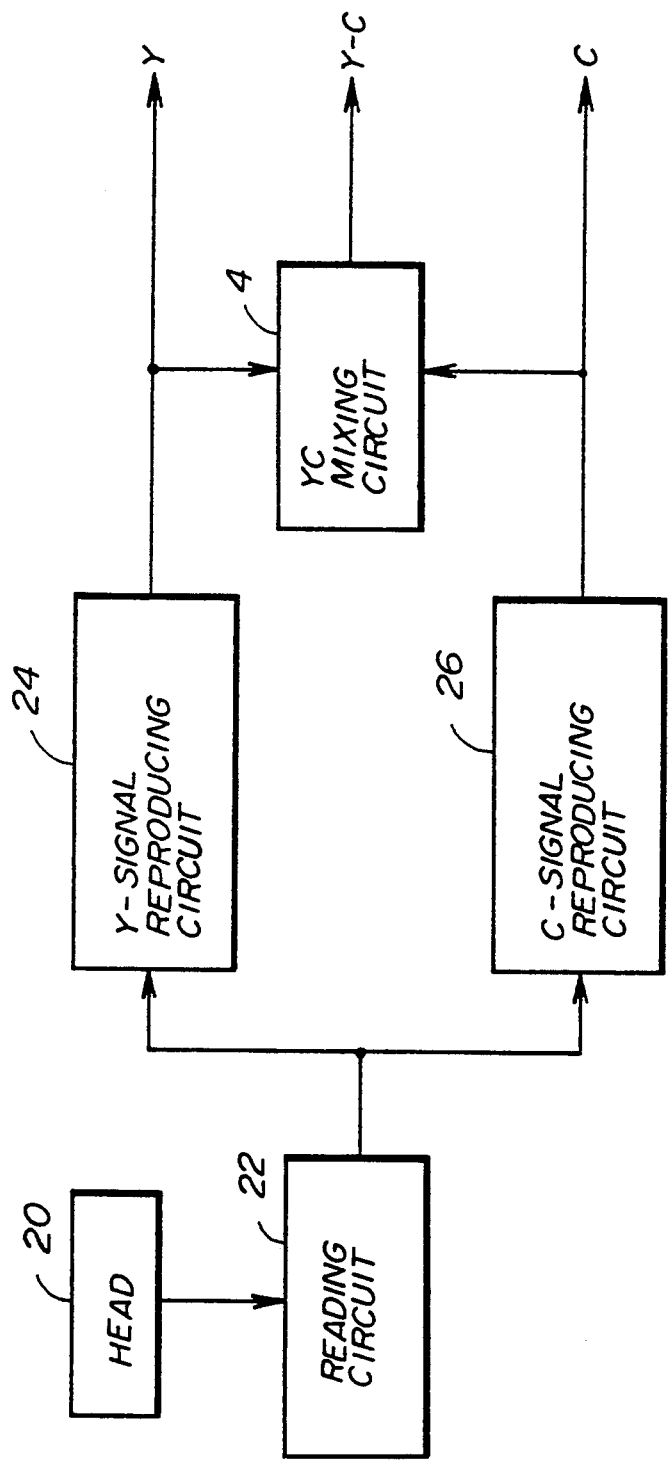

SIGNAL SUPPLYING UNIT HAVING MEANS FOR SELECTING SIGNAL IN ACCORDANCE WITH TERMINAL CONNECTION

CROSS-REFERENCE TO RELATED APPLICATIONS

This application is continuation-in-part of the application Ser. No. 07/571,738 filed Aug. 23, 1990, abandoned, for SIGNAL SUPPLYING UNIT.

BACKGROUND OF THE INVENTION

The present invention generally relates to a signal supplying unit, and more particularly to a signal supplying unit which is coupled to an external unit through terminals.

For example, a video tape recorder (hereinafter simply referred to as a VTR), which is a type of signal supply unit, generates a video signal. The video signal has a brightness signal (hereinafter referred to as a y-signal) and a chrominance signal (hereinafter referred to as a c-signal). The VTR usually outputs a video signal in which the y-signal and the c-signal are mixed through a coaxial line to a display unit which is a type of external unit. Recently, a VTR which respectively outputs the y-signal and the c-signal also has been proposed. Due to this type of VTR, it is possible to improve the quality of the image displayed on the display unit.

Thus, in the VTR which is able to output the y-signal, the c-signal and the mixture signal in which the y-signal and the c-signal are mixed, it is necessary to provide an independent terminal through which each of these three signals is output. In another case, two terminals corresponding to the y-signal and the c-signal are provided, and then by use of a manual switch, the mixture signal may be output through one of the two terminals.

In the conventional signal supplying unit which outputs a plurality of signals, it is necessary to provide an independent terminal corresponding to each of the signals, or to provide a manual switch for selecting one of the signals to be output through one terminal. However, in the case where the independent terminal corresponding to each of the signals, or to a switch, is provided, a special space must be provided for the terminal, or the manual switch, thus it is difficult to miniaturize the signal supplying unit. In addition, in the case where the manual switch is provided, it is necessary to specially operate the manual switch.

SUMMARY OF THE INVENTION

Accordingly, a general object of the present invention is to provide a novel and useful signal supplying unit in which the disadvantages of the aforementioned prior art are eliminated.

A more specific object of the present invention is to provide a signal supplying unit in which output signals are automatically selected in accordance with terminals coupled to the external unit.

The above objects of the present invention are achieved by a signal supplying unit comprising: a first terminal; a second terminal; a first signal source, coupled to the first terminal, for outputting a first signal; a second signal source, coupled to the second terminal, for outputting a second signal; a third signal source, coupled to the second terminal, for outputting a third signal; detecting means, coupled to the first terminal, for detecting whether or not the first terminal is coupled to a terminal of an external unit and for outputting a detecting signal; and selecting means, coupled to the detecting means, for selectively supplying either the second signal output from the second signal source or the third signal output from the third signal source to the second terminal in accordance with the detecting signal output from the detecting means.

The above objects of the present invention are also achieved by a signal supplying unit comprising: a first terminal; a plurality of terminals; a first signal source, coupled to the first terminal, for outputting a first signal; a second signal source for outputting a second signal; a third signal source for outputting a third signal, the second and third sources being coupled to one of the plurality of terminals; detecting means, coupled to the first terminal, for detecting whether or not the first terminal is coupled to a terminal of an external unit and for outputting a detecting signal; and selecting means, coupled to the detecting means, for selectively supplying either the second signal output from the second signal source or the third signal output from the third signal source to one of the plurality of terminals in accordance with the detecting signal output from the detecting means.

Further the above objects of the present invention are also achieved by a signal supplying unit comprising: a plurality of terminals; a plurality of signal sources, each of said plurality of signal sources outputting a signal; detecting means, coupled to at least one of said plurality of terminals, for detecting whether or not at least said one of said plurality of terminals is coupled to a terminal of an external unit; and selecting means, coupled to said detecting means, for selecting signals to be supplied to said plurality of terminals from signals output from said plurality of signal sources in accordance with a detection result obtained by said detecting means.

According to the present invention, the output signals from the signal supplying unit are automatically selected in accordance with terminals coupled to the external unit so that it is unnecessary to specially provide the manual switch and it is thus possible to decrease the number of the terminals. Thus, a signal supplying unit which is capable of being miniaturized and in which operation is simple is obtainable.

Additional objects, features and advantages of the present invention will become apparent from the following detailed description when read in conjunction with the accompanying drawings.

BRIEF DESCRIPTION OF THE DRAWINGS

FIG. 3B is a block diagram illustrating a signal reproducing circuit shown in FIG. 3A.

DESCRIPTION OF THE PREFERRED EMBODIMENT

Figure 1A:
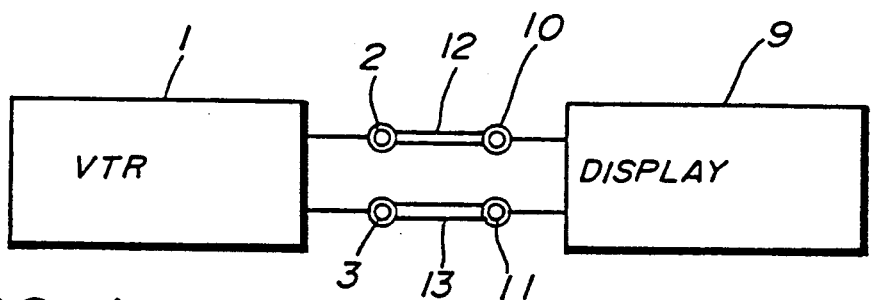
FIGS. 1A and 1B are block diagrams showing two states in which a VTR is coupled to a display unit.

A description will now be given of a first embodiment of the present invention with reference to FIGS. 1A through 2.

A VTR 1 which is a type of signal supplying unit has a y-output terminal 2 and a c-output terminal 3.

A display unit 9 which is a type of external unit has input terminals 10 and 11. There are two cases in which the VTR 1 is coupled to the display unit 9. First, as shown in FIG. 1A, the y-output terminal 2 of the VTR 1 is connected to the input terminal 10 of the display unit 9 by a coaxial cable 12, and the c-output terminal 3 is connected to the other input terminal 11 by another coaxial cable 13. Second, as shown in FIG. 1B, the y-output terminal 2 of the VTR 1 is connected to the input terminal 10 of the display unit 9 by the coaxial cable 12, but the c-output terminal 3 of the VTR 1 and the input terminal 11 of the display unit 9 are respectively opened.

Figure 2:
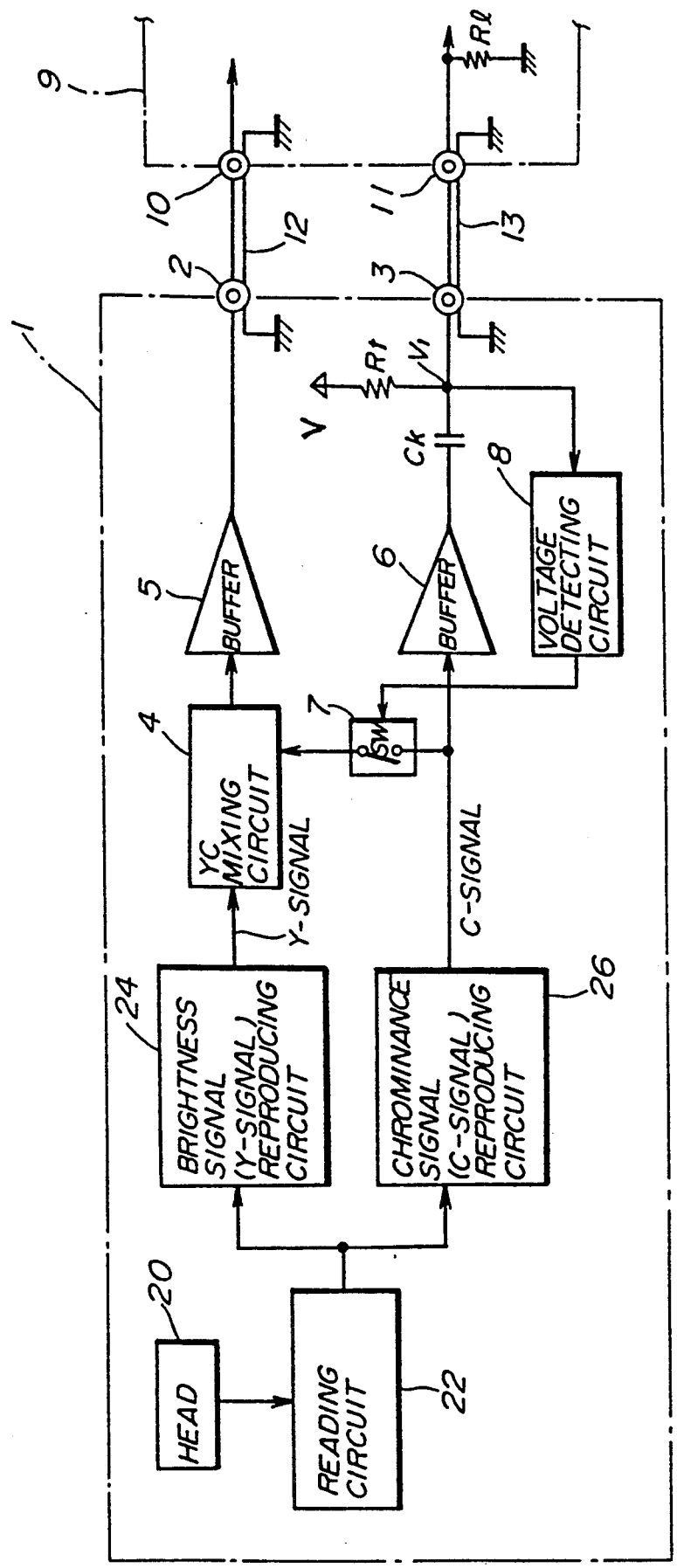
FIG. 2 is a circuit diagram showing a first embodiment of the present invention.

Referring to FIG. 2, the VTR has a head 20, a reading circuit 22, a brightness signal reproducing circuit 24 and a chrominance signal reproducing circuit 26. The head 20 magnetically detects data from a videotape and outputs a detection signal corresponding to the data. The reading circuit 22 outputs a reading signal corresponding to the detection signal from the head 20. The brightness signal reproducing circuit 24 extracts the brightness signal (y-signal) from the reading signal and outputs the y-signal. The chrominance signal reproducing circuit 26 extracts the chrominance signal (c-signal) from the reading signal and outputs the c-signal.

The VTR 1 also has a YC mixing circuit 4, buffers 5 and 6, an analogue switch 7 and a voltage detecting circuit 8. The y-signal output from the brightness signal reproducing circuit 24 is supplied to the YC mixing circuit 4. The analogue switch 7 is provided between the chrominance signal reproducing circuit 26 and the YC mixing circuit 4, and the c-signal output from the chrominance signal reproducing circuit 26 is supplied through the analogue switch 7 to the YC mixing circuit 4. When the analogue switch 7 is closed, the YC mixing circuit 4 mixes the y-signal and the c-signal and outputs a yc-mixture signal. When the analogue switch 7 is opened, the y-signal from the brightness signal reproducing circuit 24 is passed through the YC mixing circuit 4, that is, the YC mixing circuit 4 outputs the y-signal. The YC mixing circuit 4 is connected to the buffer 5 and then the signal output from the YC mixing circuit 4 is supplied through the buffer 5 to the y-output terminal 2. The y-output terminal 2 has a shield which is grounded. The chrominance signal reproducing circuit 26 is connected to the buffer 6. A coupling capacitor Ck is connected between the buffer 6 and the c-output terminal 3. The c-signal output from the chrominance signal reproducing circuit 26 is supplied through the buffer 6 and the coupling capacitor Ck to the c-output terminal 3. The c-output terminal 3 also has a shield which is grounded.

A resistor Rt is connected between the c-output terminal 3 and a power supply V, and the c-output terminal 3 is connected to the voltage detecting circuit 8. The voltage detecting circuit 8 outputs a detecting signal which, for example, has a high level when the voltage $V_1$ at the c-output terminal 3 is greater than a predetermined reference voltage. The analogue switch 7 is controlled by the voltage detecting circuit 8. That is, when the detecting signal is supplied from the voltage detecting circuit 8 to the analogue switch 7, the analogue switch 7 is turned on (closed), and when there is no detection signal output from the voltage detecting circuit 8, the analogue switch 7 is turned off (opened).

The voltage detecting circuit 8 is formed of an operational amplifier, transistors and so on, or of digital switching components such as C-MOS inverters and the like.

In the display unit 9, both input terminals 10 and 11 have shields which are respectively grounded. A resistor R1 is connected between the input terminal 11 and the ground.

The resistor Rt and the voltage detecting circuit 8 in the VTR 1 and the resistor R1 in the display unit 9 are used for detecting the state where the VTR 1 is coupled to the display unit 9. For example, when the output voltage of the power supply is equal to 5 v, the resistor Rt is equal to 1 [M $\Omega$] and the resistor R1 is equal to 75 [$\Omega$]. That is, the resistor Rt has a much larger resistance than the resistor R1.

A description will now be given of the operation of the VTR 1 shown in FIG. 2.

When the y-output terminal 2 of the VTR 1 is connected to the input terminal 10 of the display unit 9 by the coaxial cable 12 and the c-output terminal 3 of the VTR 1 is opened, as shown in FIG. 1B, the VTR 1 operates as follows.

Because the c-output terminal 3 is open, the voltage V1 which is substantially equal to the output voltage of the power supply V is input to the voltage detecting circuit 8. The voltage V1 input to the voltage detecting circuit 8 is greater than the reference voltage so that the voltage detecting circuit 8 outputs the detecting signal. Due to the detecting signal output from the voltage detecting circuit 8, the analogue switch 7 is turned on. As a result, both the y-signal and the c-signal are supplied to the YC mixing circuit 4, and then the yc-mixture signal is output from the YC mixing circuit 4. The yc-mixture signal is amplified by the buffer 5, and then the amplified yc-mixture signal is transmitted through the y-output terminal 2, the coaxial cable 12 and the input terminal 10 to the display unit 9.

Figure 1B:
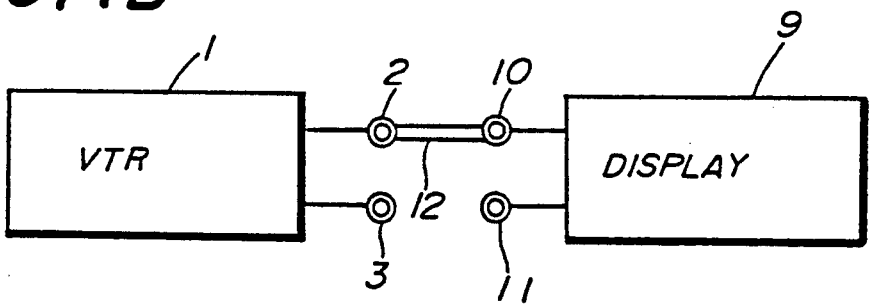

On the other hand, when the y-output terminal 2 of the VTR 1 is connected to the input terminal 10 of the display unit 9 by the coaxial cable 12 and the c-output terminal 3 of the VTR 1 is connected to the input terminal 11 of the display unit 9 by the coaxial cable 13, as shown in FIG. 1A, the VTR 1 operates as follows.

Because the c-output terminal 3 is connected to the input terminal 11, the voltage V1 which is substantially equal to the voltage drop obtained by the resistor R1 is input to the voltage detecting circuit 8. The resistor R1 in the display unit 9 has a much smaller resistance than the resistor Rt in the VTR 1, so that the voltage V1 input to the voltage detecting circuit 8 is less than the reference voltage. Thus, there is no detecting signal output from the voltage detecting circuit 8, and the analogue switch 7 is turned off. As a result, the y-signal passing through the YC mixing circuit 4 is amplified by the buffer 5. The amplified y-signal is transmitted through the y-output terminal 2, the coaxial cable 12 and the input terminal 10 to the display unit 9. In addition, the c-signal output from the chrominance signal reproducing circuit 26 is amplified by the buffer 6, and then the DC component of the amplified c-signal is eliminated by the coupling capacitor Ck. The amplified c-signal passing through the coupling capacitor Ck is transmitted through the c-output terminal 3, the coaxial cable 13 and the input terminal 11 to the display unit 9. That is, the y-signal and the c-signal are independently transmitted from the VTR 1 to the display unit 9.

According to the first embodiment described above, in accordance with whether the c-output terminal 3 of the VTR 1 is connected to the input terminal 11 of the display unit 9 or not, either a state where the yc-mixture signal is transmitted from the VTR 1 to the display unit 9 or another state where the y-signal and the c-signal are respectively transmitted from the VTR 1 to the display unit 9 is automatically selected. Thus, it is unnecessary to provide an independent terminal for a yc-mixture signal and a manual switch, so that the VTR 1 is capable of being miniaturized becomes possible, and the operation of the VTR 1 becomes simple.

Figure 3A:
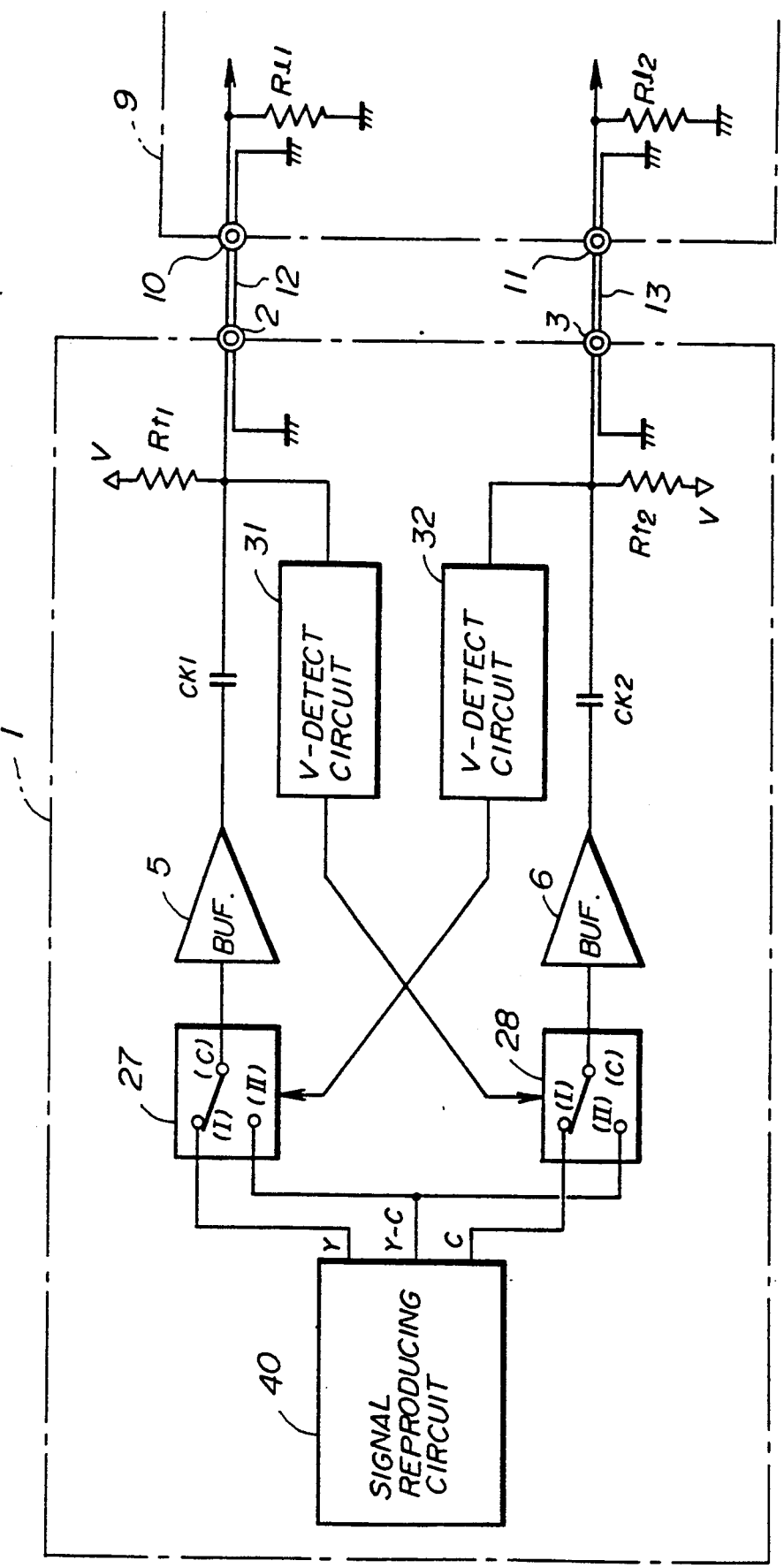
FIG. 3A is a circuit diagram illustrating a second embodiment of the present invention.

A description will now be given of a second embodiment of the present invention with reference to FIGS. 3A and 3B. In FIG. 3A, those parts which are the same as those shown in FIG. 2 are given the same reference numbers.

Referring to FIG. 3A, the VTR 1 has a signal reproducing circuit 40 outputting the y-signal, the yc-mixture signal and the c-signal. The structure of the signal reproducing circuit 40 will be described later. In the VTR 1, a switch circuit 27, a buffer 5, and a coupling capacitor Ck1 are coupled to the terminal 2, and a switch circuit 28, a buffer 6 and a coupling capacitor Ck2 are coupled to the terminal 3. The y-signal is supplied from the signal reproducing circuit 40 to a first terminal (I) of the switch circuit 27. The c-signal is supplied from the signal reproducing circuit 40 to a first terminal (I) of the switch circuit 28. The yc-mixture signal is supplied from the signal reproducing circuit to second terminals (II) of both the switch circuit 27 and 28. The buffer 5 is connected between a common terminal (c) of the switch circuit 27 and the coupling capacitor Ck1 connected to the terminal 2. The buffer 6 is connected between a common terminal (c) of the switch circuit 28 and the coupling capacitor Ck2 connected to the terminal 3. A resistor Rt1 is connected between the power supply V and the terminal 2, and a first voltage detecting circuit 31 detects whether or not a voltage at the terminal 2 is greater than a predetermined reference voltage. The first voltage detecting circuit 31 outputs a first detecting signal. When the voltage at the terminal 2 is greater than the reference voltage, the first detecting signal output from the first voltage circuit 31 has a high level. In a case opposite to the above case, the first detecting signal has a low level. The switch circuit 28 coupled to the terminal 3 is controlled by the first detecting signal. That is, when the first detecting signal has a low level, the switch circuit 28 selects the first terminal (I). When the first detecting signal has a high level, the switch circuit 28 selects the second terminal (II). A resistor Rt2 is connected between the power supply V and the terminal 3, and a second voltage detecting circuit 32 detects whether or not a voltage at the terminal 3 is greater than a predetermined reference voltage. The second voltage detecting circuit 31 outputs a second detecting signal. The second detecting signal output from the second voltage detecting circuit 32 can have a low level and high level in the same manner as the first detecting signal output from the first voltage detecting circuit 31. The switch circuit 27 coupled to the terminal 2 is controlled by the second detecting signal. That is, when the second detecting signal has a low level, the switch circuit 27 selects the first terminal (I). When the second detecting signal has a high level, the switch circuit 27 selects the second terminal (II).

The signal reproducing circuit 40 is formed as shown in FIG. 3B. Referring to FIG. 3B, the signal reproducing circuit 40 has the head 20 for magnetically detecting information, the reading circuit 22 for outputting a reading signal corresponding to the information detected by the head 20, the brightness signal reproducing circuit 24 for extracting the brightness signal (y-signal) from the reading signal, and the chrominance signal reproducing circuit 26 for extracting the chrominance signal (c-signal) from the reading signal. The signal reproducing circuit 40 also has the yc-mixing circuit 4 for mixing the y-signal and the c-signal. The yc-mixing circuit 4 outputs a yc-mixture signal. Due to the above structure, the signal reproducing circuit outputs the y-signal, the c-signal and the yc-mixture signal.

Returning to FIG. 3A, the terminals 2 and 3 are respectively connected to the input terminals 10 and 11 of the display unit 9 by the coaxial cables 12 and 13, in the same manner as those shown in FIG. 1A. Resistors R11 and R12 are respectively connected between input terminals 10 and 11 and the ground.

When the VTR 1 and the display unit 9 are connected to each other by the coaxial cables 12 and 13 as shown in FIG. 3A, both the first and second detecting signals respectively output from the first and second voltage detecting circuit 31 and 32 have the low levels. In this case, both the switch circuits 27 and 28 select the first terminal (I). Thus, the y-signal is supplied to the terminal 2 via the switch circuit 27, the buffer 5 and the coupling capacitor Ck1, and the c-signal is thus supplied to the terminal 3 via the switch circuit 28, the buffer 6 and the coupling capacitor Ck2. As a result, the y-signal and the c-signal are supplied from the VTR 1 to the display unit 9.

When only the terminal 2 of the VTR 1 is connected to the input terminal 10 of the display unit 9 by the coaxial cable 12 (the terminal 3 is open), the first voltage detecting circuit 31 outputs the first detecting signal having the low level, and the second voltage detecting circuit 32 outputs the second detecting signal having the high level. In this case, the switch circuit 27 selects the second terminal (II), so that the yc-mixture signal is supplied to the terminal 2. That is, the yc-mixture signal is supplied from the VTR 1 to the display unit 9 via the coaxial cable 12.

When only the terminal 3 of the VTR 1 is connected to the input terminal 11 by the coaxial cable 13 (the terminal 2 is open), the first and second voltage detecting circuits 31 and 32 operate contrary to the above operations. In this case, the switch circuit selects the second terminal (II), so that the yc-mixture signal is supplied to the terminal. That is, the yc-mixture signal is supplied from the VTR 1 to the display unit 9 via the coaxial cable 13.

According to the second embodiment, in accordance with whether or not either the terminal 2 or 3 of the VTR 1 is connected to the input terminal 10 or 11 of the display unit 9, either a pair of signals, consisting the y-signal and the c-signal, or the yc-mixture signal can be automatically supplied from the VTR 1 to the display unit 9 via the connected terminals.

It is possible to provide more than three terminals in the signal supplying unit. In such a case, the signal supply unit is capable of supplying more than four signals.

Figure 4A:
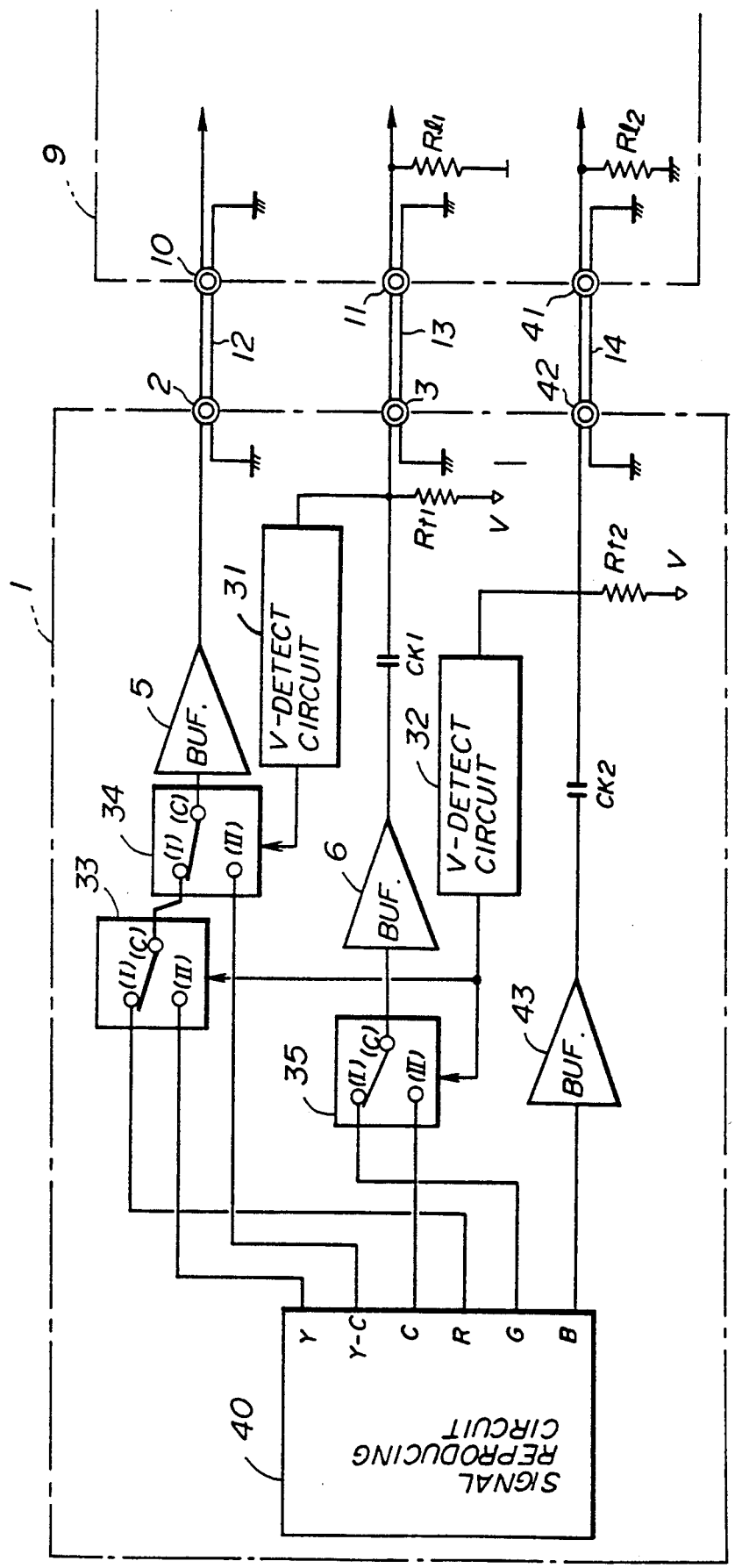
FIG. 4A is a circuit diagram illustrating a third embodiment of the present invention.
Figure 4B:
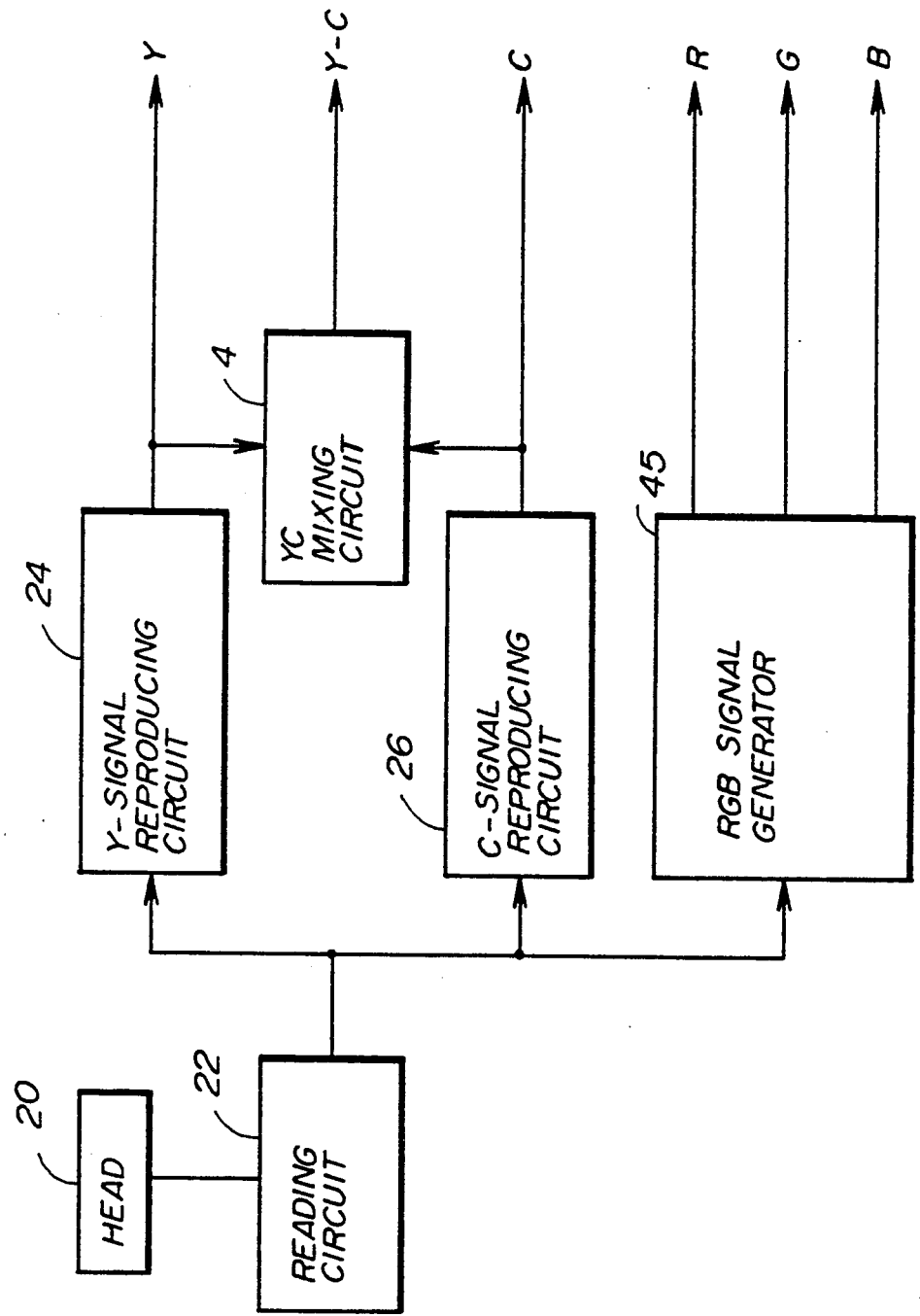
FIG. 4B is a block diagram illustrating a signal reproducing circuit shown in FIG. 4A.

A description will now be given of a third embodiment of the present invention with respect to FIGS. 4A and 4B. In the third embodiment, the VTR 1 (the signal supply unit) has three terminals. In FIGS. 4A and 4B, those parts which are the same as those shown in FIGS. 3A and 3B are given the same reference numbers.

Referring to FIG. 4A, the VTR 1 has the signal reproducing circuit 40 outputting five signals: the y-signal, the c-signal, yc-mixture signal, an R(red)-signal, a G(green)-signal and a B(blue)-signal. The structure of the signal reproducing circuit 40 will be described later. The VTR 1 has three terminals 2, 3 and 42. Switch circuits 33 and 34 are coupled to the terminal 2. The R-signal is supplied from the signal reproducing circuit 40 to a first terminal (I) of the switch circuit 33. The y-signal is supplied from the signal reproducing circuit 40 to a second terminal (II) of the switch circuit 33. A common terminal (c) of the switch circuit 33 is connected to a first terminal (I) of the switch circuit 34. The yc-mixture signal is supplied from the signal reproducing circuit 40 to a second terminal (II) of the switch circuit 34. A common circuit (c) of the switch circuit 34 is connected to the terminal 2 via the buffer 5. A switch circuit 35 is coupled to the terminal 3. The G-signal is supplied from the signal reproducing circuit 40 to a first terminal (I) of the switch circuit 35. The c-signal is supplied from the signal reproducing circuit 40 to a second terminal (II) of the switch circuit 35. A common terminal (c) of the switch circuit 35 is connected to the terminal 3 via the buffer 6 and the coupling capacitor Ck1.

The B-signal output from the signal reproducing circuit 40 is supplied to the terminal 42 via a buffer 43 and a coupling capacitor Ck2.

A resistor Rt1 is connected between the terminal 3 and the power supply V, and a first voltage detecting circuit 31 detects whether or not a voltage at the terminal 3 is greater than a predetermined reference voltage. The first voltage detecting circuit 31 outputs a first detecting signal. When the voltage at the terminal 2 is greater than the reference voltage, the first detecting signal output from the first voltage circuit 31 has a high level. In a case opposite to the above case, the first detecting signal has a low level. The switch circuit 34 is controlled by the first detecting signal. That is, when the first detecting signal has a low level, the switch circuit 34 selects the first terminal (I). When the first detecting signal has a high level, the switch circuit 34 selects the second terminal (II). A resistor Rt2 is connected between the power supply V and the terminal 42, and a second voltage detecting circuit 32 detects whether or not a voltage at the terminal 42 is greater than a predetermined reference voltage. The second voltage detecting circuit 31 outputs a second detecting signal. The second detecting signal output from the second voltage detecting circuit 32 can have a low level and high level in the same manner as the first detecting signal output from the first voltage detecting circuit 31. The switch circuits 33 and 35 are controlled by the second detecting signal. That is, when the second detecting signal has a low level, the switch circuits 33 and 35 select the first terminals (I). When the second detecting signal has a high level, the switch circuits 33 and 35 select the second terminals.

The signal reproducing circuit 40 is formed as shown in FIG. 4B. Referring to FIG. 4B, the signal reproducing circuit 40 has the head 20, the reading circuit 22, the brightness signal reproducing circuit 24 for generating the y-signal, the chrominance signal reproducing circuit 26 for generating the c-signal, and the yc-mixing circuit 4 for generating the yc-mixture signal in the same manner as that shown in FIG. 3B. The signal reproducing circuit 40 has also an RGB signal generator 34. The BGR signal generator divides the reading signal supplied from the reading circuit 22 into the R-signal, the G-signal and the B-signal.

Returning to FIG. 4A, the terminals 2, 3 and 42 are respectively connected to the input terminals 10, 11 and 41 of the display unit 9 by the coaxial cables 12, 13 and 14. Resistors R11 and R12 are respectively connected between input terminals 11 and 41 and the ground.

When the VTR 1 and the display unit 9 are connected to each other by the coaxial cables 12 and 13 as shown in FIG. 4A, the switch circuits 33, 34 and 35 select the first terminals (I) based on the first and second detecting signals (the low level) respectively output from the first and second voltage detecting circuits 31 and 32. Thus, the VTR 1 supplies the R-signal, the G-signal and the B-signal to the display unit 9 via the coaxial cables 12, 13 and 14.

When the VTR 1 and the display unit 9 are connected to each other by the coaxial cables 12 and 13 (the terminal 42 is open), the second detecting signal output from the second voltage detecting circuit 32 has the high level. In this case, both the switch circuits 33 and 35 select the second terminals (II). The switch circuit 34 selects the first terminal (I) based on the first detecting signal (the low level) output from the first voltage detecting circuit 31. Thus, the VTR 1 supplies the y-signal and the c-signal to the display unit 9 via the coaxial cables 12 and 13.

When the VTR 1 and the display unit 9 are connected to each other by the coaxial cables 12 (the terminals 3 and 42 are open), the first detecting signal output from the first voltage detecting circuit 31 has the high level. In this case, the switch circuit 34 selects the second terminal (II). Thus, the yc-signal is supplied from the VTR 1 to the display unit 9 via the coaxial cable 12.

Figure 5:
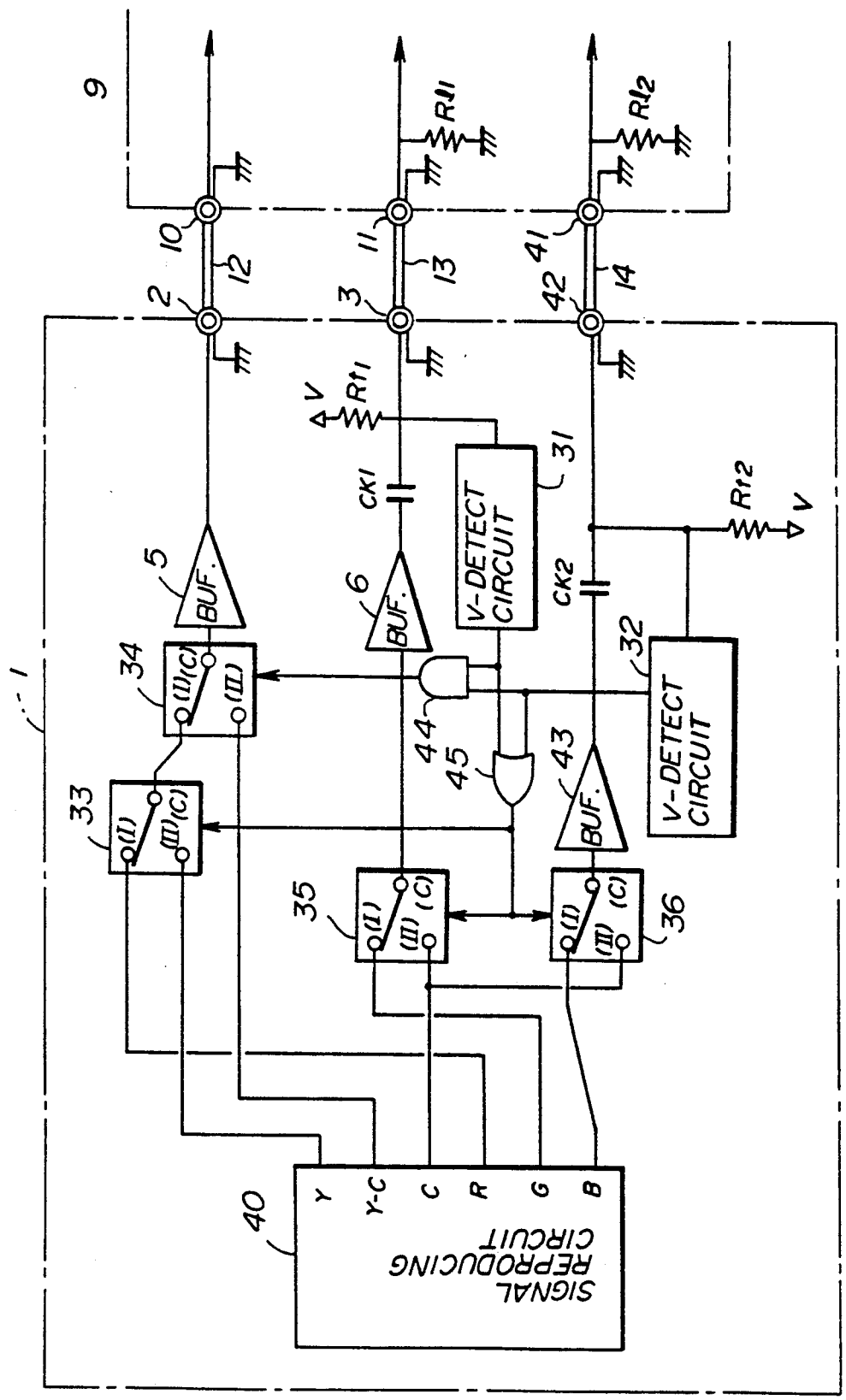
FIG. 5 is a circuit diagram illustrating a fourth embodiment of the present invention.

A description will now be given of a fourth embodiment of the present invention with reference to FIG. 5. In the fourth embodiment, also, the VTR 1 has three terminals. In FIG. 5, those parts which are the same as those shown in FIG. 4A are given the same reference numbers.

Referring to FIG. 5, the switch circuits 33 and 34 and the buffer 5 are coupled to the terminal 2, the switch circuit 35, the buffer 6 and the coupling capacitor Ck1 are coupled to the terminal 3, in the same manner as those shown in FIG. 4A. A switch circuit 36, a buffer 43 and a coupling capacitor Ck2 are coupled to the terminal 42. The B-signal is supplied from the signal reproducing circuit 40 to a first terminal (I) of the switch circuit 36. The c-signal is supplied from the signal reproducing circuit 40 to a second terminal (II) of the switch circuit 36. A common terminal (c) of the switch circuit 36 is connected to the terminal 42 via the coupling capacitor Ck2.

The resistor Rt1 is connected between the power supply V and the terminal 3, and the first voltage detecting circuit 31 detects whether or not a voltage at the terminal 3 is greater than a predetermined reference voltage. The first voltage detecting circuit 31 outputs a first detecting signal the level of which signal is changed in the same manner as that shown in FIG. 4A. The resistor Rt2 is connected between the power supply V and the terminal 42, and the second voltage detecting circuit 32 detects whether or not a voltage at the terminal 42 is greater than a predetermined reference voltage. The second voltage detecting circuit 32 outputs a second detecting signal the level of which is changed in the same manner as that shown in FIG. 4A.

The first detecting signal output from the first voltage detecting circuit 31 is supplied to an AND gate 44 and an OR gate 45. The second detecting signal output from the second voltage detecting circuit 32 is supplied to the AND gate 44 and the OR gate 45 also. The switch circuit 34 is controlled by an output signal of the AND gate 44. That is, when the output signal of the AND gate 44 has a low level, the switch circuit 34 selects the fist terminal (I). When the output signal of the AND gate 44 has a high level, the switch circuit 34 selects the second terminal (II). The switch circuits 33, 35 and 36 are controlled by an output signal of the OR gate 45. That is, when the output signal of the OR gate 45 has a low level, the switch circuits 33, 35 and 36 select the first terminals (I). When the output signal of the OR gate 45 has a high level, the switch circuits 33, 35 and 36 select the second terminals (II).

The signal reproducing circuit 40 is formed as shown in FIG. 4B. In the display unit 9 having the input terminals 10, 11 and 41, resistors R11 and R12 are connected between the terminals 11 and 41 and the ground.

When the VTR 1 and the display unit 9 are connected to each other by the coaxial cables 12, 13 and 14, the switch circuits 33, 34, 35 and 36 select the first terminals (I) based on the output signals of the AND gate 44 and the OR gate 45. In this case, the R-signal output from the signal reproducing circuit 40 is supplied to the terminal 2 via the switch circuits 33 and 34 and the buffer 5, the G-signal output from the signal reproducing circuit 40 is supplied to the terminal 3 via the switch circuit 35, the buffer 6 and the coupling capacitor Ck1, and the B-signal output from the signal reproducing circuit 40 is supplied to the terminal 42 via the buffer 43 and the coupling capacitor Ck2. Thus, the R-signal, the G-signal and the B-signal are supplied from the VTR 1 to the display unit 9 via the coaxial cables 12, 13 and 14.

When the VTR 1 and display unit 9 are connected to each other by the coaxial cables 12 and 13 (the terminal 42 is open), the second detecting signal output from the second voltage detecting circuit 32 has the high level. At this time, the first detecting signal output from the first voltage detecting circuit 31 has the low level. In this case, the switch circuits 33, 35 and 36 select the second terminals (II), and the switch circuit 34 selects the first terminal (I). Thus, the y-signal is supplied to the terminal 2 via the switch circuits 33 and 34 and the buffer 5, and the c-signal is supplied to the terminal 3 via the switch circuit 35, the buffer 6 and the coupling capacitor Ck1. That is, the y-signal and the c-signal are supplied from the VTR 1 to the display unit 9 via the coaxial cables 12 and 13.

When the VTR 1 and the display unit 9 are connected to each other by the coaxial cables 12 and 14 (the terminal 3 is open), the first detecting signal output from the first voltage detecting circuit 31 has the high level, and the second detecting signal output from the second voltage detecting circuit 32 has the low level. In this case, the switch circuits 33, 35 and 36 select the second terminals (II), and the switch circuit 34 selects the first terminal (I). Thus, the y-signal is supplied to the terminal 2 via the switch circuits 33 and 34 and the buffer 5, and the c-signal is supplied to the terminal 42 via the switch circuit 36, the buffer 6 and the coupling capacitor Ck2. That is, the y-signal and the c-signal are supplied from the VTR 1 to the display unit 9 via the coaxial cables 12 and 14.

When the VTR 1 and the display unit 9 are connected to each other by only the coaxial cable 12, both the first and second detecting signals output from the first and second voltage detecting circuits 31 and 32 have the high levels. In this case all the switch circuits 33, 34, 35 and 36 select the second terminals (II). Thus, the yc-mixture signal is supplied to the terminal 2 via the switch circuits 33 and 34 and the buffer 5.

According to the third and fourth embodiments, in accordance with whether or not the terminals 2, 3 and 42 of the VTR 1 are respectively connected to the input terminals 10, 11 and 41 of the display unit 9, signals to be output from the VTR 1 are automatically selected from the R-signal, the G-signal, the B-signal, the y-signal, the c-signal and the yc-mixtured signal.

It is also possible to apply the present invention to a variety of signal supplying units other than a VTR.

The present invention is not limited to the aforementioned embodiments, and variations and modifications may be made without departing from the scope of the claimed invention.

What is claimed is:

1. A signal supplying unit comprising:
   a first terminal;
   a second terminal;
   a first signal source, coupled to said first terminal, for outputting a first signal;
   a second signal source, coupled to said second terminal, for outputting a second signal;
   a third signal source, coupled to said second terminal, for outputting a third signal;
   detecting means, coupled to said first terminal, for detecting whether or not said first terminal is coupled to a terminal of an external unit and for outputting a detecting signal; and
   selecting means, coupled to said detecting means, for selectively supplying either said second signal output from said second signal source or said third signal output from said third signal source to said second terminal in accordance with said detecting signal output from said detecting means.

2. A signal supplying unit comprising:
   a first terminal;
   a second terminal;
   a first signal source, coupled to said first terminal, for outputting a first signal;
   a second signal source, coupled to said second terminal, for outputting a second signal;
   a third signal source, coupled to said second terminal, for outputting a third signal;
   detecting means, coupled to said first terminal, for detecting whether or not said first terminal is coupled to a terminal of an external unit and for outputting a detecting signal;
   wherein said detecting means has a first resistor connected between a power supply and said first terminal, a second resistor connected between the terminal of said external unit and the ground and voltage detecting means for detecting whether or not a voltage at said first terminal is greater than a predetermined reference voltage; and
   selecting means, coupled to said detecting means, for selectively supplying either said second signal output from said second signal source or said third signal output from said third signal source to said second terminal in accordance with said detecting signal output from said detecting means.

3. A signal supplying unit as claimed in claim 2, wherein said first resistor has a larger resistance than said second resistor.

4. A signal supplying unit as claimed in claim 1, wherein said third signal source has signal generating means for generating said third signal based on said first and second signals.

5. A signal supplying unit as claimed in claim 4, wherein said selecting means has switch means which is in either a first state or a second state in accordance with said detecting signal output from said detecting means, and wherein said third signal is supplied to said second terminal when said switch means is in said first state, and said second signal is supplied to said second terminal when said switch is in said second state.

6. A signal supplying unit comprising:
a first terminal;
a plurality of terminals;
a first signal source, coupled to said first terminal, for outputting a first signal;
a second signal source for outputting a second signal;
a third signal source for outputting a third signal, said second and third sources being coupled to one of said plurality of terminals;
detecting means, coupled to said first terminal, for detecting whether or not said first terminal is coupled to a terminal of an external unit and for outputting a detecting signal; and
selecting means, coupled to said detecting means, for selectively supplying either said second signal output from said second signal source or said third signal output from said third signal source to said one of said plurality of terminals in accordance with said detecting signal output from said detecting means.

7. A signal supplying unit comprising:
a first terminal;
a plurality of terminals;
a first signal source, coupled to said first terminal, for outputting a first signal;
a second signal source for outputting a second signal;
a third signal source for outputting a third signal, said second and third signal sources being coupled to one of said plurality of terminals;
detecting means, coupled to said first terminal, for detecting whether or not said first terminal is coupled to a terminal of an external unit and for outputting a detecting signal;
wherein said detecting means has a first resistor connected between power supply and said first terminal, a second resistor connected between the terminal of said external unit and the ground, and voltage detecting means for detecting whether or not a voltage at said first terminal is greater than a predetermined reference voltage; and
selecting means, coupled to said detecting means, for selectively supplying either said second signal output from said second signal source or said third signal output from said third signal source to said one of said plurality of terminals in accordance with said detecting signal output from said detecting means.

8. A signal supplying unit as claimed in claim 7, wherein said first resistor has a larger resistance than said second resistor.

9. A signal supplying unit as claimed in claim 6, wherein said third signal source has signal generating means for generating said third signal based on said first and second signals.

10. A signal supplying unit as claimed in claim 4, wherein said signal generating means has mixture means, coupled to said first signal source and second signal source, for outputting a mixture signal in which said first signal and said second signal are mixed, said mixture signal being used as said third signal.

11. A signal supplying unit as claimed in claim 10, wherein said selecting means has a switch device coupled to said first signal source and said mixture means, said switch device being in an on-state when said detecting means detects that said first terminal is not coupled to the terminal of said external unit, said switch device being in an off-state when said detecting means detects that said first terminal is coupled to the terminal of said external unit, and wherein, when said switch device is in the on-state, said first signal is supplied to said mixture means so that said mixture signal is supplied to said second terminal, and when said switch device is in the off-state, said second signal is supplied to said second terminal.

12. A signal supplying unit as claimed in claim 9, wherein said signal generating means has mixture means, coupled to said first signal source and second signal source, for outputting a mixture signal in which said first signal and said second signal are mixed, said mixture signal being used as said third signal.

13. A signal supplying unit comprising:
a plurality of terminals;
a plurality of signal sources, each of said plurality of signal sources outputting a signal;
detecting means, coupled to at least one of said plurality of terminals, for detecting whether or not at least said one of said plurality of terminals is coupled to a terminal of an external unit; and
selecting means, coupled to said detecting means, for selecting signals to be supplied to said plurality of terminals from signals output from said plurality of signal sources in accordance with a detecting result obtained by said detecting means.

14. A signal supplying unit as claimed in claim 13, wherein detecting means has a first resistor connected between a power supply and said one of said plurality of terminals, a second resistor connected between the terminal of said external unit and the ground and voltage detecting means for detecting whether or not a voltage at said one of said plurality of terminals is greater than a predetermined reference voltage.

15. A signal supplying unit as claimed in claim 14, wherein said first resistor has a larger resistance than said second resistor.

16. A signal supplying unit comprising:
a first terminal;
a second terminal;
a third terminal;
signal sources for respectively outputting a first, second, third, fourth, fifth and sixth signals;
detecting means; coupled to said second and third terminals, for detecting whether or not each of said second and third terminals is coupled to a terminal of an external unit; and
selecting means, coupled to said detecting means, for selecting signals to be supplied to said first, second and third terminals from the first, second, third, fourth and fifth signals output from said signal sources in accordance with a detecting result obtained by said detecting means.

17. A signal supplying unit as claimed in claim 16, wherein said selecting means comprises:

first means for supplying the first signal to said first terminal, for supplying the second signal to said second terminal, and for supplying the third signal to said third terminal, when said detecting means detects that said second and third terminals are connected to terminals of said external unit;

second means for supplying the fourth signal to said first terminal, and for supplying the fifth signal to said second terminal, when said detecting means detects that said second terminal is connected to a terminal of said external unit and said third terminal is not connected to a terminal of said external unit; and third means for supplying the sixth signal to said first terminal when said detecting means detects that said second and third terminals are not connected to terminals of said external unit.

18. A signal supplying unit as claimed in claim 17, wherein said selecting means further comprising:

fourth means for supplying the fourth signal to said first terminal, and for supplying the fifth signal to said third terminal, when said detecting means detects that said second terminal is not connected to a terminal of said external unit and said third terminal is connected to a terminal of said external unit.

* * * * *